June 4, 1963  C. VAN DER LELY  3,091,907
AGRICULTURAL IMPLEMENTS
Filed Feb. 26, 1960  2 Sheets-Sheet 1
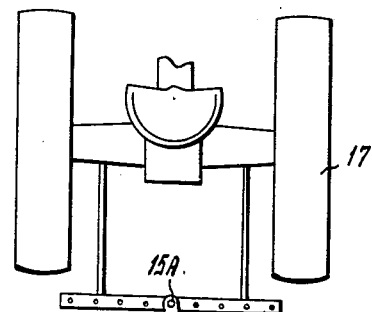
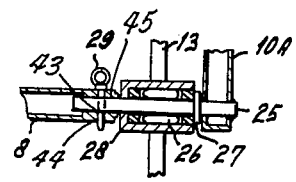
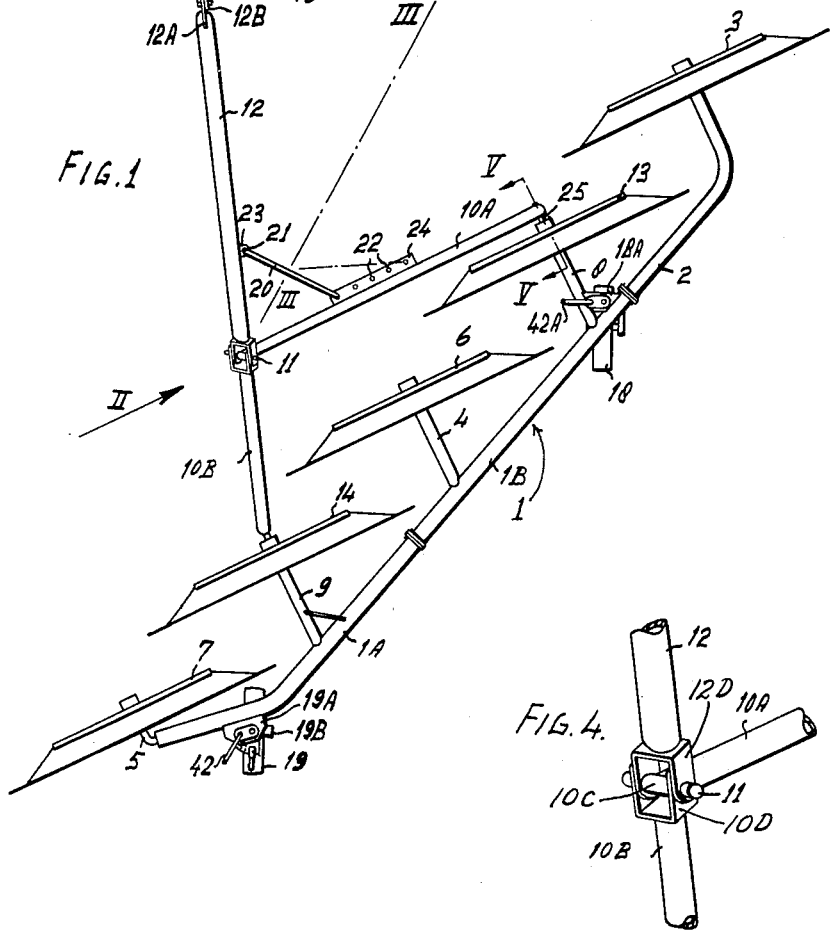

June 4, 1963 C. VAN DER LELY 3,091,907
AGRICULTURAL IMPLEMENTS
Filed Feb. 26, 1960 2 Sheets-Sheet 2
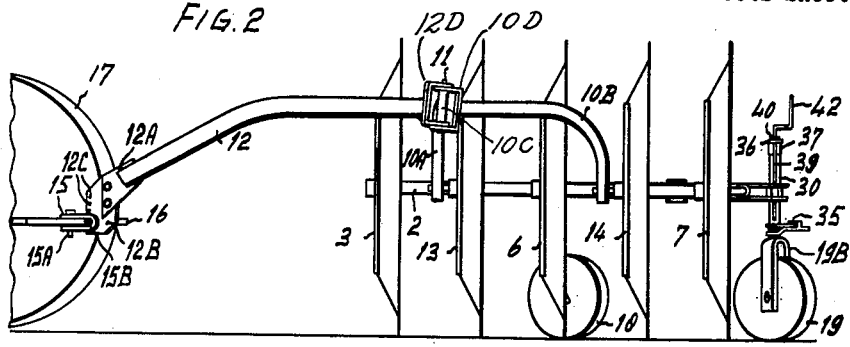
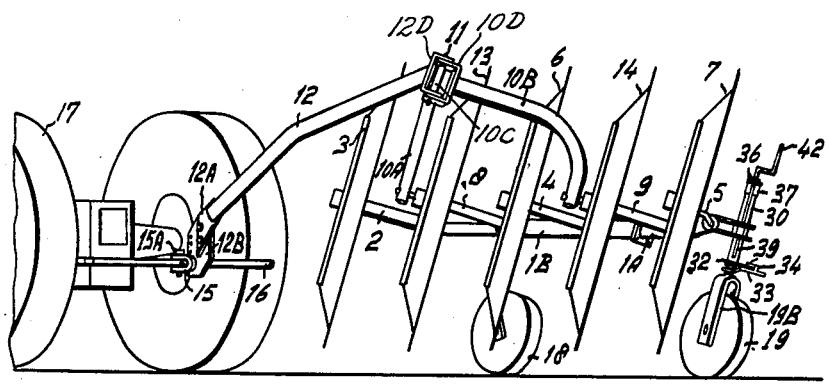
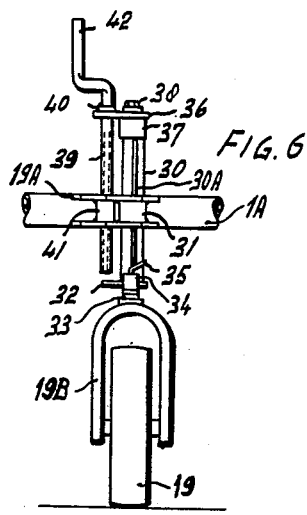

United States Patent Office 3,091,907
Patented June 4, 1963

3,091,907
AGRICULTURAL IMPLEMENTS
Cornelis van der Lely, Zug, Switzerland, assignor to Patent Concern N.V., Willemstad, Curacao, Netherlands Antilles, a limited-liability company of the Netherlands Antilles
Filed Feb. 26, 1960, Ser. No. 11,368
Claims priority, application Netherlands Mar. 7, 1959
9 Claims. (Cl. 56—377)

This invention relates to agricultural implements, and more particularly to implements of the type comprising a frame supported on ground wheels and arranged to carry a plurality of tools for performing working operations as the implement is propelled over the ground. With such implements it is normally desirable that the setting of the tools in relation to the frame can be varied. Thus, for example, when it is desired to transport the implement from one working site to another, the tools must usually be raised from the ground so that they will not undesirably encounter the ground during transport. Moreover in the use of implements of this character it may be desirable to adjust the setting of the tools in relation to the frame of the implement so that for example the pressure of the tools upon the ground may be varied or the depth at which they work in the ground can be altered.

It is an object of the invention to provide an agricultural implement in which the setting of the tools in relation to the ground, or the frame of the implement, can be easily varied.

In accordance with the invention there is provided an implement including a frame supported on ground wheels and arranged to carry a plurality of tools for performing working operations as the implement is propelled over the ground, and wherein one end of a bar is connected to the implement through the intermediary of a pivotal joint, the pivotal axis of which is such that by keeping the other end of said bar or the like at a substantially constant level whilst turning the bar about said pivotal axis, said joint is caused to rise or fall, the pivotal joint being so connected with the implement that the rise or fall thereof controls the setting of the tools in relation to the ground or the frame of the implement.

For a better understanding of the invention and to show how the same may be carried into effect, reference will now be made, by way of example, to the accompanying drawings in which:

FIGURE 1 is a plan view of an implement in accordance with the invention,

FIGURE 2 is a side elevation corresponding to FIGURE 1 as seen in the direction of the arrow II, FIGURE 3 is a view similar to FIGURE 2 but showing the implement in a position suitable for transport, FIGURE 4 shows, to an enlarged scale, a detail of FIGURE 1, FIGURE 5 is a sectional detail taken on the line V—V of FIGURE 1, to an enlarged scale; and FIGURE 6 is a side elevation of part of the implement shown in the preceding figures, to an enlarged scale.

Referring to the drawings, therein there is shown an agricultural implement in which the tools of the implement are in the form of rake wheels, the implement being adapted to operate as a side-delivery rake. The implement has a frame comprising frame beams 1, 10A and 10B. Beam 1 is coupled at one end to a supporting arm 2 of a freely rotatable rake wheel 3. There are further supporting arms 4, 5, 8 and 9 secured to the frame beam 1 and extending laterally therefrom. The supporting arms 4 and 5 carry freely rotatable rake wheels 6 and 7.

Frame beams 10A and 10B are connected end to end by a pin 11 so as effectively to constitute a second composite frame beam. Frame beam 10A has an end portion 10C which is formed as a sleeve and surrounds pin 10, this being most clearly visible in FIG. 4 Frame beam 10B has a bifurcated bracket 10D connected to the end thereof adapted for rotation about pin 11. The free end of the frame beam 10A is connected to the free end of the supporting arm 8, and likewise the free end of the beam 10B is connected to the free end of the supporting arm 9. The manner of connection is in both cases the same, and it will be described in respect of the connection between the supporting arm 8 and the beam 10A. From FIGURE 5 it will be seen that the beam 10A has a pin 25 fixed therein, such pin being entered in a hole 45 formed in the end of the supporting arm 8. An aperture 43 is formed in the pin 25 and can be brought into register with a corresponding aperture 44 formed in the end of the supporting arm 8 whereby a locking pin 29 can be entered in the registering apertures as shown in FIGURE 5. The pin 25 serves not only to connect the members 8 and 10A, but also to support the hub 28 of a further rake wheel 13. The hub 28 contains a bearing 26 formed on the pin 25. The flange 27 ensures that the rake wheel 13 is positioned against axial displacement along the pin 25, the rake wheel 13 being however free to rotate about the axis of the pin 25. The similar connection between the members 9 and 10B has a rake wheel 14 mounted in like manner upon a pin corresponding to the pin 25.

As may be seen more clearly from FIGURE 4, the frame beam 10B has attached to one end a bifurcated bracket 10D which engages the pin 11. The end of the frame beam 10A is also secured to the pin 11 through the intermediary of sleeve 10C. There is a further bifurcated bracket 12D secured to one end of a draw-bar 12, this bracket engaging also the pin 11 such that the draw-bar 12 may be swung about the axis of the pin 11 with reference to the frame of the implement. As seen in FIGURE 1, the draw-bar 12 has a lateral lug 23 formed with an aperture in which a down-turned end 21 of a stay-bar 20 is entered.

The other end of the stay-bar 20 is likewise down-turned and can be entered in any one of a series of holes 22 formed in a rib 24 attached to the beam 10A. The forward end of the draw-bar 12 has a vertical plate 12A secured therein. The plate 12A is bolted rigidly to a further plate 12B formed with a series of holes 12C. The tractor 17 for towing the implement has a towing bar 16 found with a series of holes. A U-shaped bracket 15 has the legs thereof disposed one above and one below the bar 16 and held in position by a pin 15A entered in one of the holes in the towing bar 16. The curved forward end of the bracket 15 is gapped so as to accommodate the plate 12B with considerable clearance. The plate 12B is secured to the bracket 15 with the aid of a pin 15B which is passed through one of the holes 12C in the plate 12B.

The whole arrangement is such that the draw-bar 12 can be turned to some extent about the axis of its forward end with respect to the towing-bar 16 of the tractor.

The implement is supported upon ground wheels 18 and 19. The ground wheel 18 is mounted upon a web 18A extending between the frame beam 1 and the supporting arm 8 as appears from FIGURE 1. This ground wheel is formed as a freely swivelling castor wheel and is mounted so that it can support the frame at various levels. There is a handle 42A for controlling the vertical adjustment of the ground wheel 18. The mechanism whereby this vertical adjustment is achieved is the same as a mechanism provided for the same purpose in relation to the ground wheel 19 and will be described in detail for this ground wheel 19. The frame beam 1 has a bracket 19A secured thereto and serving to support two collars 31 and 41 (see FIG. 6). The collar 31 slidably receives a sleeve 30 formed with a longitudinally extending rib 30A which is accommodated in a slot formed in the collar. Hence the sleeve can be moved up and down within the collar but cannot be turned relatively thereto. The lower end of the sleeve has a sector plate 32 secured thereto. A vertical shaft is housed within the sleeve 30, and carries fixedly at its lower end an arm 33 (see FIG. 3) formed with a finger 34 which overlies the sector plate 32. The sector plate has a series of holes centered upon the axis of the sleeve 30, and the finger 34 is formed with a hole which can be brought into register with any of the holes in the sector plate 32. A locking pin 35 may be passed through the registering holes to lock the finger and hence the vertical shaft to which it is attached, from angular movement in the sleeve 30. The lower end of the shaft is formed as a fork 19B which supports the ground wheel 19 for rotation.

The upper end of the sleeve 30 has an enlarged portion 37 to which is fixed a laterally extending arm 36. The arm 36 serves to close the end of the sleeve 30 but is formed with a hole which permits a bolt 38 to be passed with clearance therethrough.

The bolt 38 is engaged in an internally screw-threaded hole formed in the top end of the vertical shaft, the lower end of which has the fork 19B. Hence such shaft is prevented from moving axially within the sleeve 30 although it is not prevented from turning in the sleeve. The arm 36 is formed with a hole in which a rod 39 is entered so as to be freely rotatable. The rod has a flange 40 which bears upon the upper side of the arm 36, and has also a cranked handle 42. The rod 39 is externally screw-threaded over the major part of its length and engages in an internally screw-threaded hole formed in the collar 41 so that the latter constitutes a fixed nut.

It will be evident that with the ground wheel 19 resting upon the ground and supporting the frame beam 1, the frame will be effectively suspended upon the rod 39, which will correspondingly be in tension.

If the handle 42 is turned in one direction it will cause the nut 41 to be raised thereby lifting the frame with reference to the ground wheel 19. An opposite rotation of the handle 42 will allow the nut 41 to move downwardly thereby allowing the frame to fall with respect to the ground wheel 19. Unlike the ground wheel 18, the ground wheel 19 is not free to swivel about a vertical axis. It can however be brought to various settings with the aid of the pin 35. When such pin is removed from the finger 34, the arm 33 attached to the vertical shaft which supports the ground wheel 19 can be moved angularly. When the wheel 19 has a desired new setting imparted thereto, the pin 35 can be replaced in the finger 34 so that it engages another registering hole in the sector plate 32.

In the position of the implement shown in FIGURES 1 and 2, the rake wheels 3, 13, 6, 14 and 7 each contact the ground, and by virtue of their oblique setting in relation to the line of travel of the tractor 17, cause the rake wheels to rotate when the tractor is driven forwardly. The leading rake wheel 3 displaces crop lying on the ground into the path of the next succeeding rake wheel 13 which in turn displaces the crop to the next rake wheel 6 and so on down the row to the last rake wheel 7 which displaces the crop to the left. Hence the implement will act as a side-delivery rake, delivering to the left. If the draw-bar 12 is disconnected from the towing bar 16 of the tractor, the draw-bar may be swung from the full line position shown in FIGURE 1 to the chain dotted line position indicated at III—III in FIGURE 1, the stay-rod 20 being shifted also from the full line position to the chain dotted line position indicated. The pin 11 is not however vertical, being contained in a vertical plane which is substantially perpendicular to the line III—III but being inclined to the vertical in such plane so that the upper end of the pin 11 lies nearer to the composite frame beam 1 than does the lower end of such pin. In swinging the tow-bar 12 from the full line position to the chain dot line position, it will be appreciated that the end of the draw-bar remote from the pin 11 will move downwardly. If now the draw-bar 12 is attached once more to the towing-bar 16, then the frame of the implement will be tilted about the line of contact of the ground wheels 18 and 19 with the ground. The pin 11 will be raised as compared with the position which it previously occupied. In FIGURE 3 the implement is seen connected with the tractor, the draw-bar 12 having been swung from the full line position shown in FIGURE 1 to the chain dot line position. From FIGURE 3 it will be seen how the frame has been tilted with the result that the rake wheels have been lifted clear of the ground. In this position the implement may be transported from one site for work to another.

It will be obvious to those skilled in the art to modify and vary the disclosed apparatus while remaining within the scope of the present invention.

Thus for example it will be apparent that the particular way in which the pin 11 is shown inclined to the vertical in FIGURE 1 represents but a convenient example and the same effect can be obtained if the pin is inclined in other ways. Similarly, the rake wheels have been illustrated with mountings which permit free rotation of the rake wheels, such mountings being fixed to the frame of the implement hence causing the rake wheels to be lifted from the ground to the position shown in FIGURE 3 when the tow-bar is appropriately mounted at the ends of cranks which may be pivotally attached to the frame so that the rake wheels rise and fall independently of one another as the result of pivotal movement of the cranks.

Furthermore, the joint formed by pin 11 between frames 10A, 10B and draw-bar 12 is susceptible of variation in numerous ways, the disclosed embodiment merely being exemplary.

The invention therefore should be viewed in the spirit of the following claim.

What we claim is:

1. An implement comprising a frame, ground working means coupled to said frame for performing ground working operations during movement of the implement, a draw bar having opposite ends, connecting means connecting one of said ends of said draw bar and said frame and defining a vertically inclined pivot axis therebetween, and means coupled to the other end of said draw bar to maintain the same at a substantially constant elevation so that angular movement of said draw bar causes vertical displacement of said connecting means.

2. An implement as claimed in claim 1 comprising means for locking the draw bar and the frame together to prevent movement therebetween.

3. An implement as claimed in claim 1 wherein said ground working means is coupled to said frame for displacement therewith whereby vertical displacement of said connecting means causes vertical displacement of said ground working means.

4. An implement as claimed in claim 2 comprising two ground wheels supporting said frame, said connecting means being remote from a line joining said wheels so that displacement of said connecting means causes a tilting of said frame about said line.

5. An implement as claimed in claim 4 wherein said ground working means comprises a plurality of rake wheels.

6. An implement as claimed in claim 4 comprising means coupling said ground wheels and said frame in vertically adjustable relation.

7. An implement as claimed in claim 6 wherein said means coupling said ground wheels and said frame comprises a vertical shaft on each said wheel which is slidable in said frame, a threaded spindle coupled to said shaft and in threaded engagement with said frame whereby the degree of engagement of said spindle in said frame adjusts the height of the frame with respect to the wheels.

8. An implement as claimed in claim 5 wherein said frame comprises first and second frame beams, said first frame beam supporting said rake wheels, said second beam being coupled to the first said beam and said connecting means.

9. An implement as claimed in claim 8 wherein said second frame beam comprises two beams in endwise relation coupled to said one end of said draw bar.

References Cited in the file of this patent
FOREIGN PATENTS

| | | |
|---|---|---|
| 532,560 | Belgium | Oct. 30, 1954 |
| 1,095,043 | France | Dec. 15, 1954 |